United States Patent [19]
Li et al.

[11] Patent Number: 5,453,831
[45] Date of Patent: Sep. 26, 1995

[54] METHOD FOR CALIBRATING A FLYING HEIGHT TESTER UTILIZING A WEDGE SLIDER AND TRANSPARENT DISC HELD TOGETHER

[75] Inventors: Yufeng Li, Eden Prairie; Peter R. Goglia, Edina; Christopher C. Zahn, Minneapolis, all of Minn.

[73] Assignee: Seagate Technology, Inc., Scotts Valley, Calif.

[21] Appl. No.: 303,418

[22] Filed: Sep. 9, 1994

Related U.S. Application Data

[62] Division of Ser. No. 184,995, Jan. 24, 1994, Pat. No. 5,410,402.

[51] Int. Cl.$^6$ .............................. G01J 1/02; G01B 11/02
[52] U.S. Cl. .............................. 356/243; 356/257
[58] Field of Search .............................. 356/243, 355, 356/357, 358

[56] References Cited

U.S. PATENT DOCUMENTS

| | | | |
|---|---|---|---|
| 4,346,996 | 8/1982 | Miller | 356/243 |
| 4,624,564 | 11/1986 | Dahlgren | 356/243 |
| 4,988,194 | 1/1991 | Hara et al. | |
| 5,220,408 | 6/1993 | Mager | 356/372 |
| 5,280,340 | 1/1994 | Lacey | 356/357 |

FOREIGN PATENT DOCUMENTS

| | | | |
|---|---|---|---|
| 1-013408 | 1/1989 | Japan | 356/243 |
| 4050605 | 2/1992 | Japan | 356/243 |

OTHER PUBLICATIONS

Fumitaka Muranushi, Katsuyuki Tanaka, Yoshinori Takeuchi, *Estimation of the Zero–Spacing Error Due to a Phase Shift of Reflected Light in Measuring a Magnetic Head Slider's Flying Height by Light Interference*, Adv. Info. Storage Syst., vol. 4, 1992 American Society of Mechanical Engineers.

*Primary Examiner*—Samuel A. Turner
*Assistant Examiner*—Jason D. Eisenberg
*Attorney, Agent, or Firm*—Kinney & Lange

[57] ABSTRACT

A calibration standard for uniformly calibrating flying height testers. The calibration standard includes a wedge slider held in contact with a glass disc by a load bridge, load spring and cover case. The wedge slider has a first rail and a second rail extending along its length and has a raised end to form an optical wedge between the glass disc and the first and second rails. A profilometer is used to map any surface irregularities on the surfaces of the first and second rails facing the disc, allowing the calculation of an accurate expected distance, or flying height, between the surfaces and the disc at each horizontal location along the length of the wedge slider. The expected flying height is compared to a flying height measured through optical interference techniques to calibrate the flying height tester.

9 Claims, 2 Drawing Sheets

METHOD FOR CALIBRATING A FLYING HEIGHT TESTER UTILIZING A WEDGE SLIDER AND TRANSPARENT DISC HELD TOGETHER

This is a division of application Ser. No. 08/184,995, filed Jan. 24, 1994, now U.S. Pat. No. 5,410,402.

BACKGROUND OF THE INVENTION

In the disc recording art, it is common to use read/write heads which react against the air moved with the rotating disc, causing the heads to "fly" a small distance from the disc surface. In the manufacture of such read/write heads, it is common to test the hydrodynamic characteristics of the heads so that the flying height characteristics are known, thereby avoiding the use of heads which fly too high or too low in relationship to disc surface and also avoiding heads which fly at an improper angle to the disc. Too high a flying height will result in lower areal density, while too low a flying height can cause head/disc interface failure.

Flying height testing is generally accomplished by means of a flying height tester, using optical interference techniques. Such a flying height tester comprises, for example, a monochromatic light source directing monochromatic light at a glass disc. The glass disc is rotated at speeds simulating the rotation of a magnetic disc, and the head assembly being tested is positioned in a holder in flying relation to the glass disc. Monochromatic light is directed at the disc at a predetermined angle to the surface thereof. Light is reflected from the surface of the disc closest to the flying head, as well as from the surface of the flying head itself, and impinges onto a light sensitive sensor.

The flying height between the head and the disc can be determined by the intensity of the light for a monochromatic light source, or by the constructive or destructive wavelength of the light for a white light source. A computer is programmed to receive data from the flying height tester and calculates the perceived flying height and angle of the head. With the rapid advance of disc drive technology, the flying height of many modern disc drives is less than 0.1 microns. Therefore, the accuracy of the flying height tester, and therefore its calibration, is an important concern.

Calibration of flying height testers has been accomplished through the use of a standard head whose characteristics are known. However, after repeated use, the reflective surface and flying characteristics of the head are altered by dust, oil and other foreign matter, altering the calibration of the standard. Calibration of flying height testers has also been accomplished through the use of a standard comprising a substrate having a reflective layer deposited thereon to represent the head and a transparent layer having a predetermined thickness deposited on the reflective layer. The standard is then placed in the flying height tester with the transparent layer spaced from the disc and monochromatic light is directed at the standard. A disadvantage of such a standard is that it uses a transparent material rather than air between the disc and the reflective layer. In addition, such a standard does not provide for the accurate determination of position along the length of the standard.

SUMMARY OF THE INVENTION

The present invention provides a calibration standard for the accurate, uniform calibration of flying height testers. The calibration standard of the present invention comprises a wedge slider held in contact with a transparent disc through the use of a load bridge, a load spring and a cover case. One end of the wedge slider is raised, thereby creating an optical wedge between the wedge slider and the disc. The cover case provides a sealed environment free of dust and other contaminants.

The wedge slider has both a first rail and a second rail, each of which extends along the length of the wedge slider and has a surface facing the disc. The first rail has a plurality of cylindrical portions therein at regularly spaced intervals. Each cylindrical portion has a diameter that is equal to the diameter of the beam spot from the light source of the flying height tester, thus allowing the beam spot to be matched exactly at the position of any given cylindrical portion. This allows the uniform calibration of multiple flying height testers with a single standard as well as the calibration of the same tester at different times. Measurement errors are also minimized as the exact location of each of the cylindrical portions is known.

The second rail has a width that is greater than the diameter of the beam spot, thereby allowing for a continuous optical wedge measurement along its length. The second rail also has a plurality of marks on one side which can be used to determine the position along the length of the wedge slider at which a measurement is taken.

To calibrate the flying height tester, the distance or flying height between the wedge slider and the disc must be measured at a plurality of locations along its length and compared with known, or expected, values of the flying height at those locations. The flying height is measured at a plurality of locations through the use of known optical interference techniques. The expected value of the flying height at each position along the length of the wedge slider is calculated using the known dimensions of the wedge slider. This calculation is then corrected for any surface irregularities found during a mapping of the surface of the first and second rails.

DETAILED DESCRIPTION OF THE PREFERRED EMBODIMENTS

Figure 1:
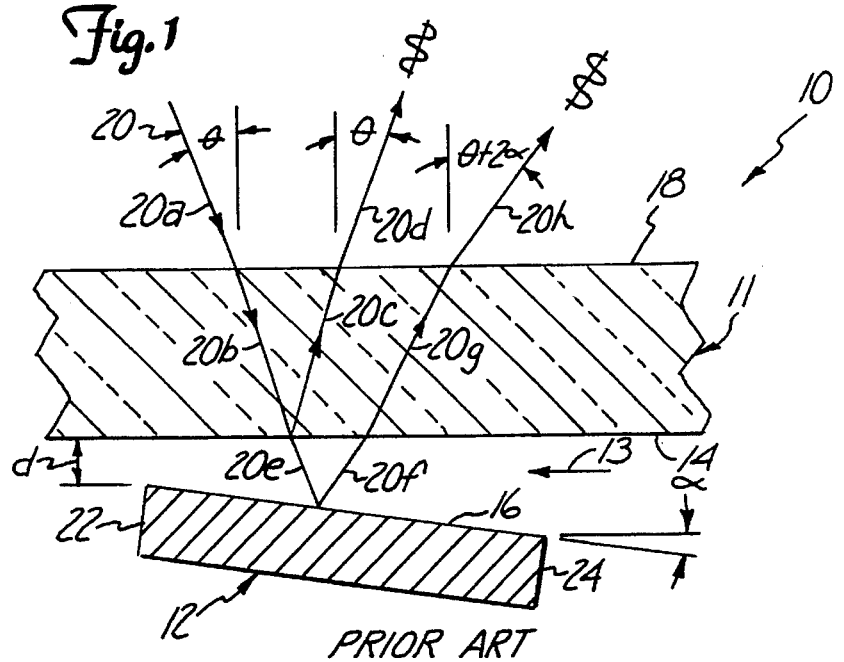
FIG. 1 is a schematic cross-sectional view of a portion of a standard flying height tester for measuring flying height characteristics of read/write heads.

FIG. 1 shows a portion of a flying height tester 10 which is used to test flying height characteristics for magnetic heads. A transparent disc 11 is rotated about its axis so that a magnetic head 12 "flies" above the surface 14 of the disc 11 due to air flow in the direction of arrow 13 caused by the rotation of the disc 11. Monochromatic light from a light source (not shown) is directed along a path through the disc 11 and is reflected off surface 14 of disc 11 and surface 16 of head 12 toward a light sensitive sensor. Specifically, the monochromatic light impinges disc 11 at an incident angle θ to surface 18, following path 20a to surface 18 of disc 11 and path 20b through the disc 11. The light is split and partially reflected off surface 14 to follow path 20c through the disc 11 and thereupon path 20d to the sensor. The other portion of the split light follows path 20e to reflect off surface 16 of head 12 and follow path 20f to surface 14 of the disc 11, path 20g through the disc 11 and path 20h to the sensor. The slight angular deviations at the interface between air and disc are caused by the Snell effect. It should be noted that paths 20a and 20d are each oriented at an angle θ from the vertical and that path 20h is not parallel to path 20d but is at an angle θ+2α to the vertical, where angle α is the angle of orientation of the flying head 12 with respect to surface 14.

Path 20a represents only one of numerous parallel beams of light used in the tester. The sensor, therefore, will receive light from the paths 20d and 20h corresponding to each of the numerous paths 20a. As a result, the light received by the sensor will include, at any given location, light from a path 20d from one beam and light from a path 20h from another beam. The distance d between the head 12 and the surface 14 of the disc 11 can be determined by the intensity of the light impinging on the sensor for a monochromatic light source, or by the constructive or destructive wavelength of light for a white light source. The angle α can be determined by finding the distance d at a plurality of points.

Figure 2:
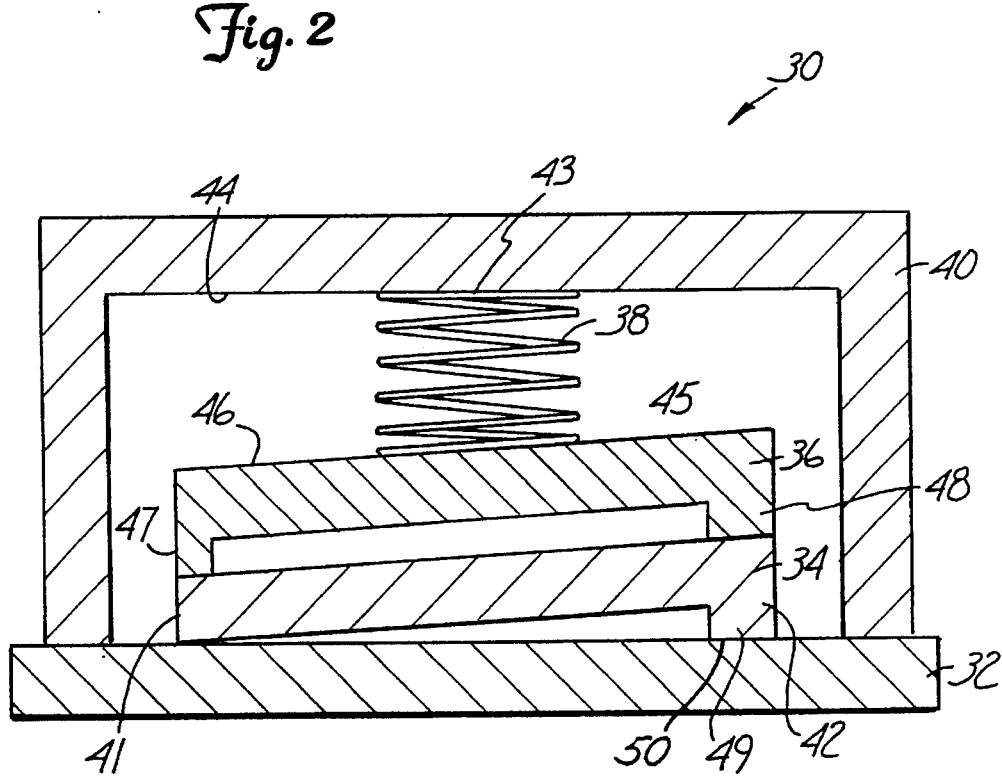
FIG. 2 is a schematic cross-sectional view of a calibration standard of the present invention.

The calibration standard 30 of the present invention is shown in FIG. 2 and comprises a glass disc 32, a wedge slider 34, a load bridge 36, a load spring 38 and a cover case 40. The wedge slider 34 contacts the disc 32 at both a first end 41 and a second end 42 and is held in contact with the disc 32 through the use of the load spring 38, the load bridge 36 and the cover case 40. The cover case 40 contacts the glass disc 32 and is held in place through the use of an adhesive. A first end 43 of the load spring 38 contacts an inner surface 44 of the cover case 40 while a second end 45 of the load spring 38 contacts a top surface 46 of the load bridge 36. The load bridge 36 has a first leg 47 and a second leg 48 which contact the wedge slider 34 at its first end 41 and second end 42, respectively, so as to transmit the force from the load spring 38 to the wedge slider 34 without deforming the wedge slider 34. The load spring 38 is designed to provide sufficient pressure to firmly hold the wedge slider 34 against the disc 32 without causing deformation of the wedge slider 34 or the disc 32.

A pair of bumps 49 at the second end 42 of the wedge slider 34 create a wedge-shaped space between the wedge slider 34 and the glass disc 32. The bumps 49, which can be seen in more detail in FIG. 3, each have a generally flat surface 50 which contacts with the disc 32. In addition to providing a backing for the load spring 38, the cover case 40 provides a sealed environment for the wedge slider 34, thereby reducing the deterioration of the wedge slider 34 through the build-up of dust and other contaminants. The wedge slider 34 is generally fabricated from the same material as that from which the sliders to be measured are fabricated. This eliminates any error that might occur due to differences in the properties of the materials.

Figure 3:
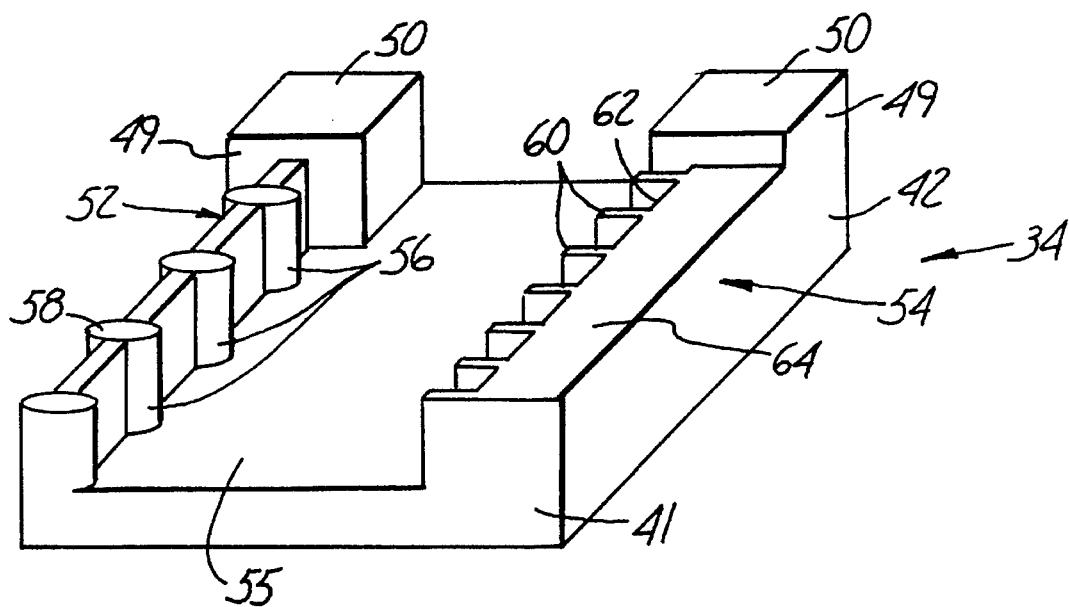
FIG. 3 is a schematic view of a portion of a calibration standard of the present invention.

The wedge slider 34 is shown in more detail in FIG. 3, and is shown as having both a first rail 52 and a second rail 54, each of which extends between the first end 41 and the second end 42 of the wedge slider 34. The first rail 52 includes a plurality of cylindrical portions 56 located at regularly spaced intervals along its length each of which has a first end 57 which is a part of a generally flat surface 58 of the first rail 52. The second rail 54 has a plurality of regularly spaced protrusions 60 extending from a first side 62 and has a generally flat surface 64. Both the first rail 52 and the second rail 54 extend the same distance from a first surface 55 of the wedge slider 34 so that the surfaces 58 and 64 are in the same plane. In addition, each of the bumps 49 extends the same distance from the first surface 55.

Figure 4:
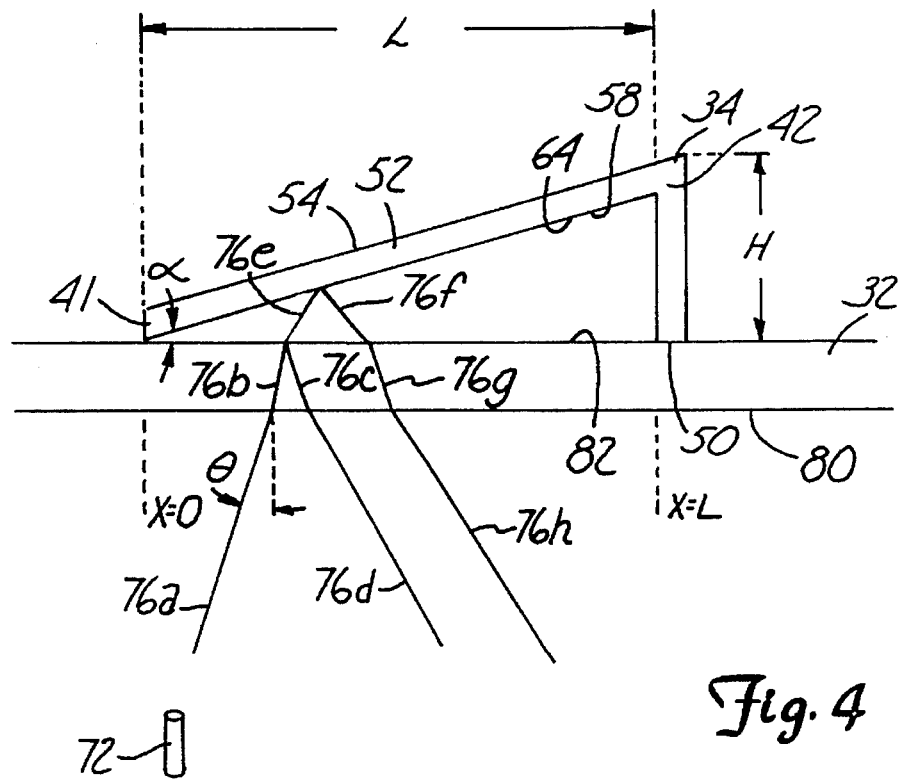
FIG. 4 is a schematic cross-sectional view of a portion of a calibration standard of the present invention.

The position of the wedge slider 34 on the glass disc 32 is shown in detail in FIG. 4. The horizontal position along the length of the wedge slider 34 is defined by the variable x which is measured along an x-axis that begins at the first end 41 of the wedge slider 34 where x=0 and ends at the second end 42 of the wedge slider 34 where x=L. The vertical distance, or flying height, between the glass disc 32 and the surfaces 58 and 64 of the first and second rails 52 and 54 is defined by the variable h. The flying height h varies with x and is zero at x=0 and H at x=L.

To calibrate a flying height tester using the calibration standard 30 of the present invention, a measured flying height h is compared with a known, or expected, value of h at a plurality of points along the x-axis. To do this, it is first necessary to determine an expected flying height h between the surfaces 58 and 64 of the first and second rails 52 and 54 and the glass disc 32 at each point along the x-axis.

If the surface 58 of the first rail 52 and the surface 64 of the second rail 54 were perfectly flat, an expected value of the flying height h of the wedge slider 34 could be easily determined at each point along the x-axis through the use of the equation h=xH/L. However, in even the most carefully fabricated wedge slider 34, the surfaces 58 and 64 of the first and second rails 52 and 54 will not be perfectly flat. Rather, they will have small, almost imperceptible, surface flaws. To compensate for these surface flaws and the resulting errors they can cause in the determination of the flying height h, the surfaces 58 and 64 of the first rail 52 and the second rail 54 are mapped through the use of a profilometer. Generally, the results of this mapping are stored in a computer as a correction function and an appropriate correction value is either added to or subtracted from the flying height h given by the equation h=xH/L at each horizontal position. Through the use of the correction values, the exact flying height h of the surface 58 of the first rail 52 and the surface 64 of the second rail 54 is known for each value of x. The mapping of the first and second rails 52 and 54, as well as the measurement of L and H, is generally done prior to the positioning of the wedge slider 34 in the calibration standard 30.

To measure the flying height h of the wedge slider 34, the calibration standard 30 is positioned in the flying height tester adjacent to a light source 72 of the tester. To do this, the disc 11 of the flying height tester is removed and the glass disc 32 along with the rest of the calibration standard 30 is inserted. Generally, the calibration standard 30 is mounted with the glass disc 32 facing upward, the calibration standard 30 being inverted from the orientation shown in FIG. 2.

Once the calibration standard 30 is in place, a continuous optical wedge measurement is made on the second rail 54 from the horizontal position x=0 to the horizontal position x=L. At each point along the x-axis, monochromatic light is directed at the glass disc 32 from the light source 72 along path 76a, as shown in FIG. 4. The light impinges the disc 32 at an incident angle θ to a first surface 80 of the disc 32 and continues through the disc 32 along path 76b to a second surface 82, where it is divided and partially reflected. The reflected portion follows path 76c through the disc 32 to first surface 80, and then follows path 76d to the flying height tester sensor (not shown). The remaining light follows path 76e to the surface 64 of the second rail 54 where it is reflected and directed at the glass disc 32 via path 76f. The light impinges the disc 32 at its second surface 82, follows path 76g through the disc 32 and then follows path 76h to the sensor (not shown). The slight angular deviations between paths at the interface between the air and the disc 32 are due to the Snell effect. Because the effects of the Snell effect are self-canceling, light path 76e is parallel to the path 76a and path 76h is parallel to path 76f. Both the height H and the incident angle θ have been exaggerated in FIG. 4 for illustrative purposes. Path 76a is actually substantially normal to disc 32. The height H is generally between 12 and 13 microinches, while the length L is generally 100 mils.

The light source 72 is moved along the x-axis so that light is reflected off of each point along the surface 64 of the second rail 54. The additive and subtractive nature of the reflected light along paths 76d and 76h creates a continuous spectrum containing segments of high intensity light as well as darker segments for the sensor. From this continuous spectrum can be found values for both the maximum intensity $I_{max}$ and the minimum intensity $I_{min}$ of the light on the sensor. This process is known as light intensity calibration. The surface 64 of the second rail 54 is fabricated so that it has a width greater than the width of the beam spot from the light source 72. Therefore the entire beam spot will be reflected from the second rail 54, allowing an accurate measurement of $I_{max}$ and $I_{min}$.

Assuming normal incidence to the disc 32 and neglecting the angle α, which is generally very small, the total intensity I of the light shining on the sensor is given by the equation:

$$I = I_1 + I_2 + 2\sqrt{I_1 + I_2} \sin\left(4\frac{\pi}{\lambda} h + \phi\right)$$

where $I_1$ represents the intensity of the light impinging on the sensor from the path 76d of one beam, while $I_2$ represents the intensity of the light impinging on the sensor from the path 76h of a second beam. This equation represents the relationship between the flying height h of the wedge slider 34 and the intensity I of the light impinging on the sensor. Both $I_1$ and $I_2$ are constants and are defined in terms of $I_{max}$ and $I_{min}$ by the equations:

$$I_{max} = I_1 + I_2 + 2\sqrt{I_1 I_2}$$

$$I_{min} = I_1 + I_2 - 2\sqrt{I_1 I_2}$$

where $I_{max}$ and $I_{min}$ are constants whose values are determined through the light intensity calibration procedure discussed above. The value of φ from the first equation is also a constant and is determined by the equation:

$$\phi = \tan^{-1}\left(\frac{2k}{1 - n^2 - k^2}\right)$$

where n and k represent the index of refraction and coefficient of extinction, respectively, of the material used to fabricate the wedge slider 34. Once the values of $I_1$, $I_2$ and φ are determined, the first equation can be used to determine the flying height h from measurements of the intensity I of the light impinging on the sensor. The above equations for I, $I_{max}$ and $I_{min}$ are used for a single reflection from the wedge slider 34. For situations involving multiple reflections, the principle and procedure remains the same, but the equations must be slightly modified to account for the multiple reflections.

Once the constants in the first above equation are determined, the flying height h can be measured. The flying height h is generally measured at ten or more locations along the length of the wedge slider 34. For each location, the intensity I of the light impinging on the sensor is measured and used to calculate the flying height h. The measured flying height h can then be compared to the expected flying height to calibrate the flying height tester.

For an accurate measurement of the flying height h, a knowledge of the exact location along the x-axis at which the flying height h is being measured is extremely important. It is for this reason that the cylindrical portions 56 are provided on the first rail 52 of the wedge slider 34. Each cylindrical portion 56 has a diameter that is equal to that of the beam spot from the light source 72, allowing the beam spot to be matched exactly at the position of any given cylindrical portion 56. The flying height h of the wedge slider 34 can therefore be measured at a position along the x-axis that is known exactly. Without the use of the cylindrical portions 56, the position along the x-axis at which the flying height h is to be measured must be measured from the first end 41 of the wedge slider 34 and the introduction of a measurement error is likely. Because the exact location along the x-axis of the cylindrical portions 56 is known and remains constant, a single wedge slider 34 can be used to calibrate more than one flying height tester with great consistency. Also, measurements of the flying height h can be taken more quickly than if the horizontal location had to be measured from the first end 41 of the wedge slider 34.

While measuring the flying height along the first rail 52 has the advantage of the use of the cylindrical portions 56, the flying height can also be measured along the second rail 54. The regularly spaced protrusions 60 of the second rail 54 act as reference marks with known locations to help increase the accuracy in determining the location along the x-axis at which the flying height h is being measured.

The wedge slider 34 is fabricated through the use of well-known thin-film deposition techniques. During fabrication, a block of the same material as that of the wedge slider 34 can also be fabricated. This piece of material will generally have the same optical properties as the wedge slider 34 and is used to determine the index of refraction n and the coefficient of extinction k of the material used to fabricate the wedge slider 34. These optical properties n and k are then used to determine the constant φ through the use of the equations given above. With the increasingly small flying heights h of today's magnetic heads, it is increasingly important to accurately consider the effects of the optical properties of the wedge slider 34 in calibrating the flying height tester.

The bumps 49 of the wedge slider 34 can be made sufficiently high to allow calibration of the flying height tester in any of a variety of flying height ranges by providing a wedge having a continuous spacing variation from zero to a selected H. While current flying heights are generally less than one tenth of a micron, it is possible to make a wedge slider 34 having a large enough wedge spacing to calibrate flying height testers used to test older heads which generally have much higher flying heights.

While calibration of the flying height tester has been described with reference to light from a monochromatic light source, both polychromatic and white light may also be used. For polychromatic light, the calibration of the flying height tester is performed in exactly the same manner as that described for monochromatic light. The only difference is that the sensor can independently detect the intensity of the light impinging thereon for each wavelength. For white light, the constructive or destructive wavelength of light is used to determine the flying height h.

Although the present invention has been described with reference to preferred embodiments, workers skilled in the art will recognize that changes may be made in form and detail without departing from the spirit and scope of the invention.

What is claimed is:

1. A method of calibrating a flying height tester that uses optical interference techniques to determine a flying height of magnetic heads, the method comprising the steps of:

inserting a calibration standard in the flying height tester, the calibration standard having a transparent disc and a wedge slider forming a generally Wedge-shaped space between the wedge slider and the disc;

determining an expected distance between the disc and a facing surface of the wedge slider at a plurality of locations along a length of the wedge slider;

determining a measured distance between the disc and a facing surface of the wedge slider through optical interference techniques at each of the plurality of locations along the length of the wedge slider at which an expected distance was determined; and comparing the expected distance with the measured distance at at least one of the plurality of locations.

2. The method of claim 1 wherein the wedge slider has a first end, a second end and a first rail extending between the first and second ends, the first rail having a first surface facing the disc.

3. The method of claim 2 wherein the facing surface of the wedge slider is the first surface of the first rail.

4. The method of claim 3 wherein the first rail has a plurality of cylindrical portions therein, each of which has a first end facing the disc and a diameter equal to a diameter of a beam of light produced by a light source in the flying height tester.

5. The method of claim 4 wherein the locations along the length of the wedge slider at which the measured distance is determined are the locations of the cylindrical portions of the first rail.

6. The method of claim 5 and the additional step of determining at least one optical property of a material of the wedge slider for use in proving accuracy of the step of determining a measured distance.

7. The method of claim 3 and the additional step of determining a correction value for each location along the length of the wedge slider, wherein the correction values represent surface irregularities on the first surface of the first rail and are used to improve accuracy of the step of determining the expected distance between the disc and the first surface of the first rail.

8. The method of claim 7 and the additional step of mapping the first surface of the first rail using a profilometer to determine any surface irregularities of the first surface of the first rail.

9. A method of calibrating a flying height tester that uses optical interference techniques to determine a flying height of magnetic heads, the method comprising the steps of:

inserting a calibration standard in the flying height tester, the calibration standard having a transparent disc and a wedge slider forming a generally wedge-shaped space between the wedge slider and the disc;

determining a measured distance between the disc and a facing surface of the wedge slider through optical interference techniques at a plurality of locations along a length of the wedge slider; and comparing the measured distance with a predetermined expected distance between the disc and the facing surface of the wedge slider at each of the plurality of locations along the length of the wedge slider at which a measured distance was determined.

* * * * *

UNITED STATES PATENT AND TRADEMARK OFFICE
CERTIFICATE OF CORRECTION

PATENT NO. : 5,453,831
DATED : September 26, 1995
INVENTOR(S) : LI YUFENG, PETER R. GOGLIA, CHRISTOPHER C. ZAHN It is certified that error appears in the above-indentified patent and that said Letters Patent is hereby corrected as shown below:

Col. 8, line 6, delete "in proving", insert --improving--

Signed and Sealed this

Twenty-third Day of January, 1996

Attest:

BRUCE LEHMAN

*Attesting Officer*     *Commissioner of Patents and Trademarks*